United States Patent [19]

Arulandu et al.

[11] Patent Number: 5,697,683
[45] Date of Patent: Dec. 16, 1997

[54] BIASED SCRAPING APPARATUS FOR AN IDLER

[75] Inventors: Jeffery R. Arulandu, Peoria; Jerry D. Fidler, Mossville; Dave E. Keedy; Larry K. Rhodes, both of Pekin, all of Ill.

[73] Assignee: Caterpillar Inc., Peoria, Ill.

[21] Appl. No.: 764,956

[22] Filed: Dec. 13, 1996

[51] Int. Cl.$^6$ ................................................. B62D 55/088
[52] U.S. Cl. ........................................... 305/110; 305/107
[58] Field of Search .............................. 305/100, 107, 305/109, 110, 115; 172/112, 610; 404/129; 280/855, 856

[56] References Cited

U.S. PATENT DOCUMENTS

| 702,868 | 6/1902 | Clucas | 404/129 |
|---|---|---|---|
| 2,077,919 | 4/1937 | Engstrom | 305/110 X |
| 2,560,307 | 7/1951 | Slemmons | 305/110 X |

FOREIGN PATENT DOCUMENTS 3317485 11/1984 Germany ................................ 172/610

*Primary Examiner*—Russell D. Stormer
*Attorney, Agent, or Firm*—William C. Perry

[57] ABSTRACT

In the operation of a track chain assembly a high degree of wear is normally experienced due to the environment in which a track-type machine must operate. This wear is typically accelerated by foreign matter that is carried by an idler member of the track chain assembly and is permitted to remain on its contact surfaces as they engage the other track chain components. The present invention provides a scraper assembly that defines a plurality of scraping portions that are adapted to carry a scraping insert on an end portion thereof. The scraping inserts are continuously urged into engagement with the contact surfaces of the idler to remove foreign material therefrom before the contact surfaces engage other track chain components.

17 Claims, 3 Drawing Sheets

५,६९७,६८३

BIASED SCRAPING APPARATUS FOR AN IDLER

TECHNICAL FIELD

This invention relates to a scraping apparatus for a track assembly and more particularly to a scraping assembly that will remove foreign matter from the idler member of a track assembly.

BACKGROUND ART

It is very common for construction machinery to be operated in very hostile environments, especially those propelled by the use of track assemblies. In most instances the machinery, such as a track-type tractor for instance, will be operated over all types of soil in a variety of conditions that includes mud, dust and sand. The track assemblies by the nature of their design are subjected to a high degree of wear. This wear is greatly accelerated when operated in certain types of soils such as sand, tar sand or other well known abrasive materials.

During the operation of a track-type machine, the track links and shoes pick up material as they contact the ground and carry it upward, over the lower run of the track assembly as the track chain rotates. When in the elevated position, the debris becomes loosened from the upper track components and drops down on the lower run of the track. When this occurs, the debris often falls on the contact surfaces, or wear surfaces, of the various track chain components. When this material is gritty or naturally abrasive, the wear, due to the constant contact between these surfaces, is greatly accelerated. The wear surfaces of particular concern include the wear rails of the track links and the tread portions of the track rollers and track idlers.

Because of this long standing problem several attempts have been made to provide various scraper and/or guard assemblies to prevent the build up of material on the track chain components or to deflect the debris away from critical areas. While some of these designs have been known to operate with some success, the overall mass of the guarding components is often excessive, adding to the weight and cost of the machine. The same can be said with some scraper designs which, in many cases, are relatively intricate. In some instances, the designs incorporate a detailed profile that matches that of one or more track chain components and functions to remove material from the various components as they rotate during the operation of the machine. These types of designs are often subject to severe wear also. Not only does the intricacy of these designs add significantly to the cost of their manufacture, it also adds to the cost of replacement parts.

Still further, other designs have been developed that utilize a block of elastomeric material that is fixed to the track roller frame along one end portion thereof and defines a second end portion that engages the idler of a track assembly. The elastomeric material is divided into three separate "fingers" that engage three separate surfaces of the idler. The separate fingers function to remove material from the idler as the idler rotates, thereby reducing the amount of the material that is carried by the idler. In doing so, the presence of foreign material positioned along the interface between the idler and the other components with which it comes into contact, is greatly reduced as is the wear of these various components. Such a design is disclosed in patent application Ser. No. 08/670,382, filed on Jun. 25, 1996 and is assigned to the assignee of the subject application. While this design has been known to work quite well in most applications, there are certain conditions wherein contact between the elastomeric material and the idler is not continually maintained, thus reducing the effectiveness of the design. This condition exists primarily when the idler is moved up and down as the machine traversed uneven terrain.

The present invention is directed to overcoming one or more of the problems set forth above.

DISCLOSURE OF THE INVENTION

In one aspect of the present invention, a scraping apparatus is provided for a track assembly. The scraping apparatus includes a frame and an idler rotatably mounted to the frame. The idler has an upraised center portion and a pair of contact surfaces positioned on opposite sides of the center portion. The idler is mounted to the frame in a manner wherein the contact surfaces are positioned for engagement with the track assembly. A scraper assembly is provided that includes a first and second end portion. The first end portion defines a plurality of scraping surfaces and the second end portion is mounted to the frame. At least one biasing member is adapted for engagement with the scraper assembly to urge each of the scraping surfaces into continuous engagement with the center portion and respective contact surfaces defined by the idler.

With a scraping apparatus as set forth above, it can be seen that a scraping assembly is provided to continuously engage the outer surfaces of the idler of a track assembly. In doing so, debris that is carried by the idler will be removed through contact with the scraping assembly as the idler rotates. This effectively prevents the debris from remaining on the contact surfaces of the idler during their engagement with the track assembly thereby avoid unnecessary and accelerated wearing of the track chain components.

BEST MODE FOR CARRYING OUT THE INVENTION

Figure 1:
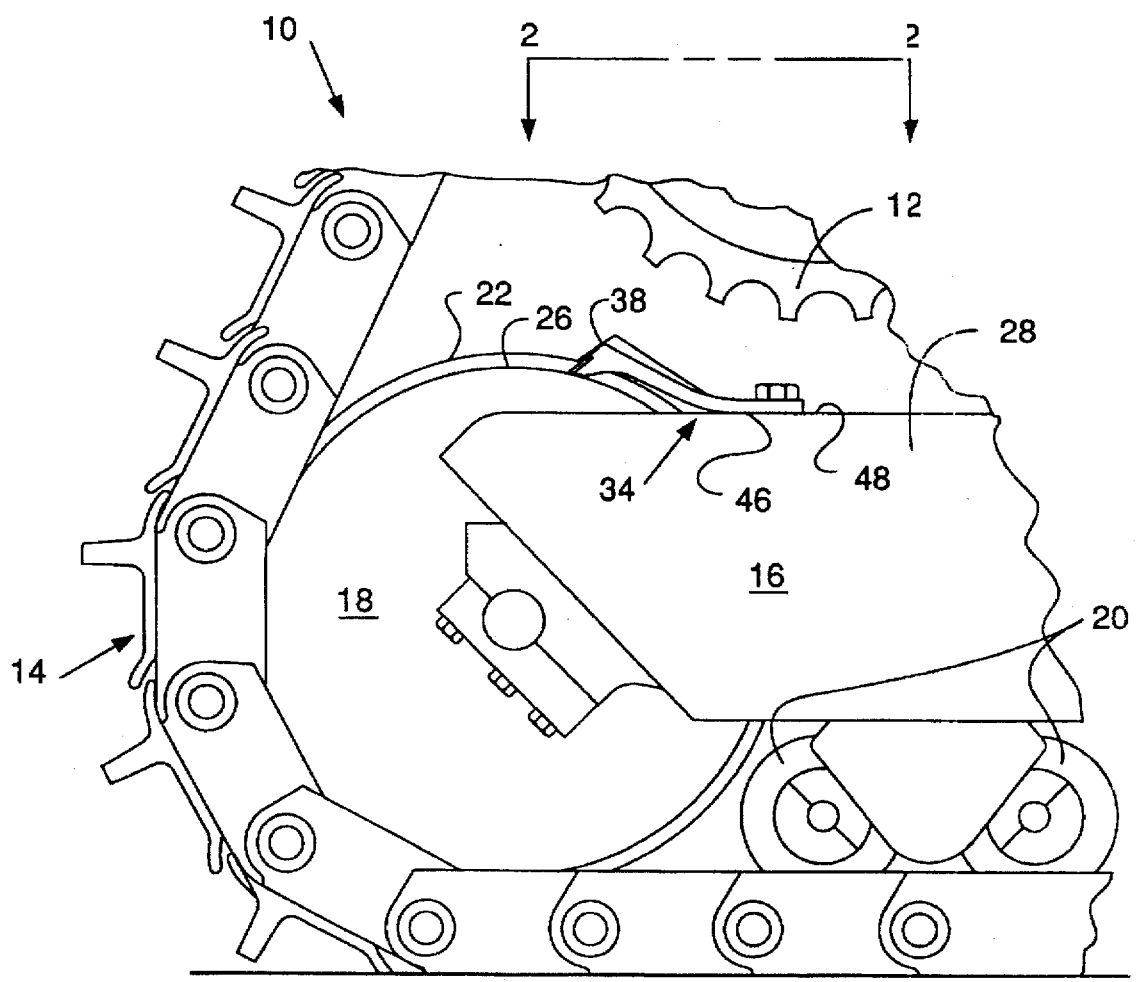
FIG. 1 is a fragmentary, diagrammatic side view of a portion of a track assembly that embodies the principles of the present invention.

Referring now to the drawings, in particular to FIG. 1, it can be seen that a portion of a track-type construction machine 10 is shown. The machine includes a track assembly of well known construction that includes a sprocket 12 that is mounted to a drive train (not shown) and rotated in a conventional manner. The sprocket in turn, is engaged with a track chain assembly 14 of conventional construction to provide motive traction between the ground and the machine to propel the machine over the terrain. The track chain assembly 14 is supported by a track roller frame 16 that mounts at least one idler 18 on the track roller frame. The idler 18 is mounted for rotation about a mounting shaft 19 that is defined on a bogie arm 20 that is pivotally mounted to the track roller frame for movement relative thereto. While not shown in the instant illustration, it is to be understood that a second idler could be mounted on an opposing end portion of the track roller frame. A plurality of track rollers 21 are mounted to the track frame in a conventional manner are positioned adjacent the idler 18. The track chain assembly 14 is entrained about and supported by the sprocket 12, the idler 18 and track rollers 21. When rotated by the sprocket, the track chain assembly rotates about these components in rolling contact therewith, when the machine is moved in either direction.

The idler 18 defines an upraised center portion 22 and a pair of contact surfaces 24 and 26 that are positioned on opposite sides of the center portion 22. The center portion is positioned centrally with respect to the track chain assembly 14 to serve as a guide member while the contact surfaces engage portions of the spaced track links (not shown) defined by the track assembly. As previously set forth, the idler 18 is mounted at on end portion 28 of the track roller frame 16. The end portion 28 of the track roller frame is bifurcated to define a pair of spaced apart arms 30 and 32. The idler 18 is positioned between arms 30 and 32 defined by the track roller frame. Idler 18 is rotatably mounted about an axis that is transversely positioned with respect to the respective pairs of bifurcated arms 30 and 32.

Figure 2:
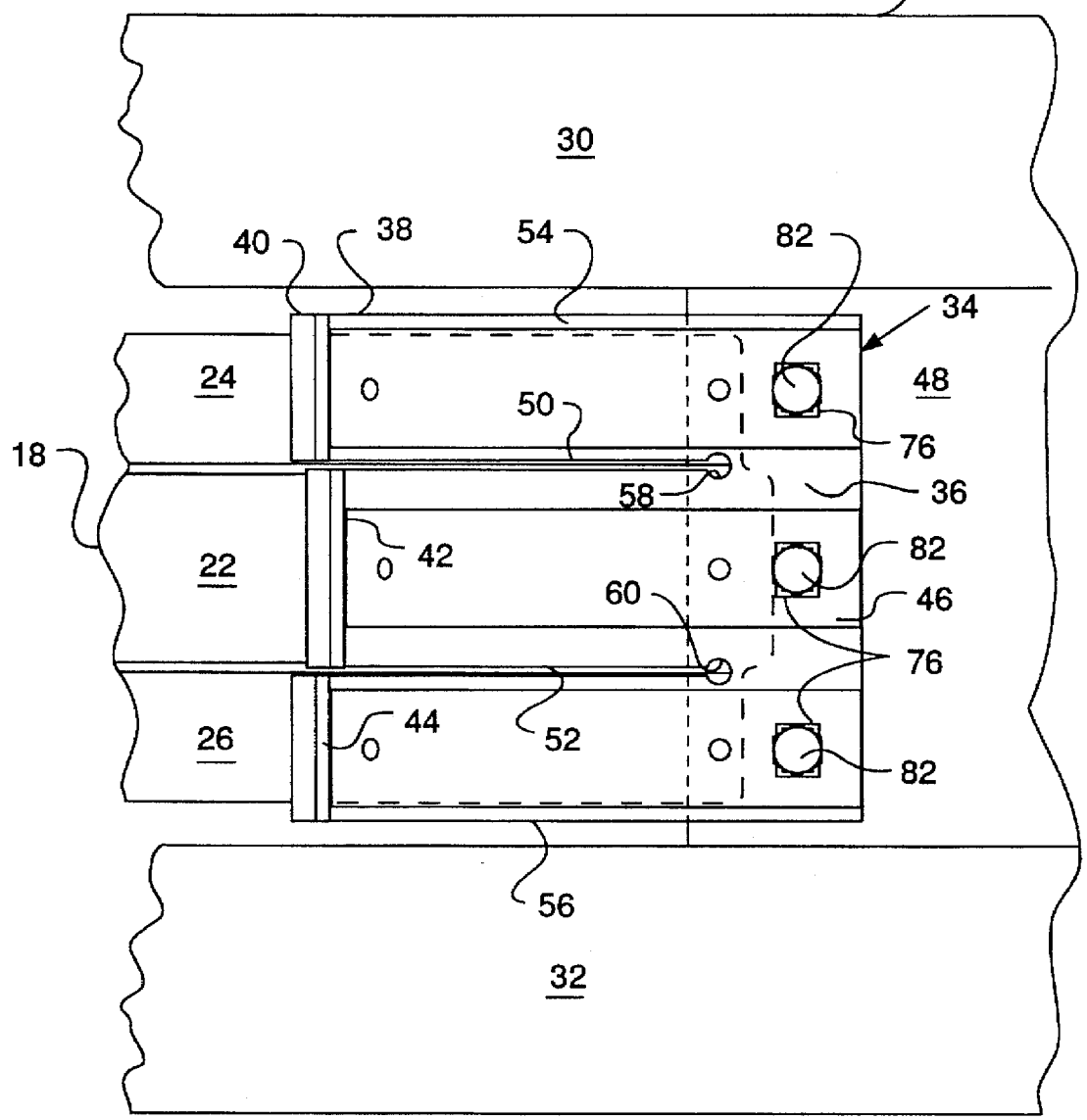
FIG. 2 is a diagrammatic top view of FIG. 1 taken along lines 2—2 of FIG. 1.
Figure 3:
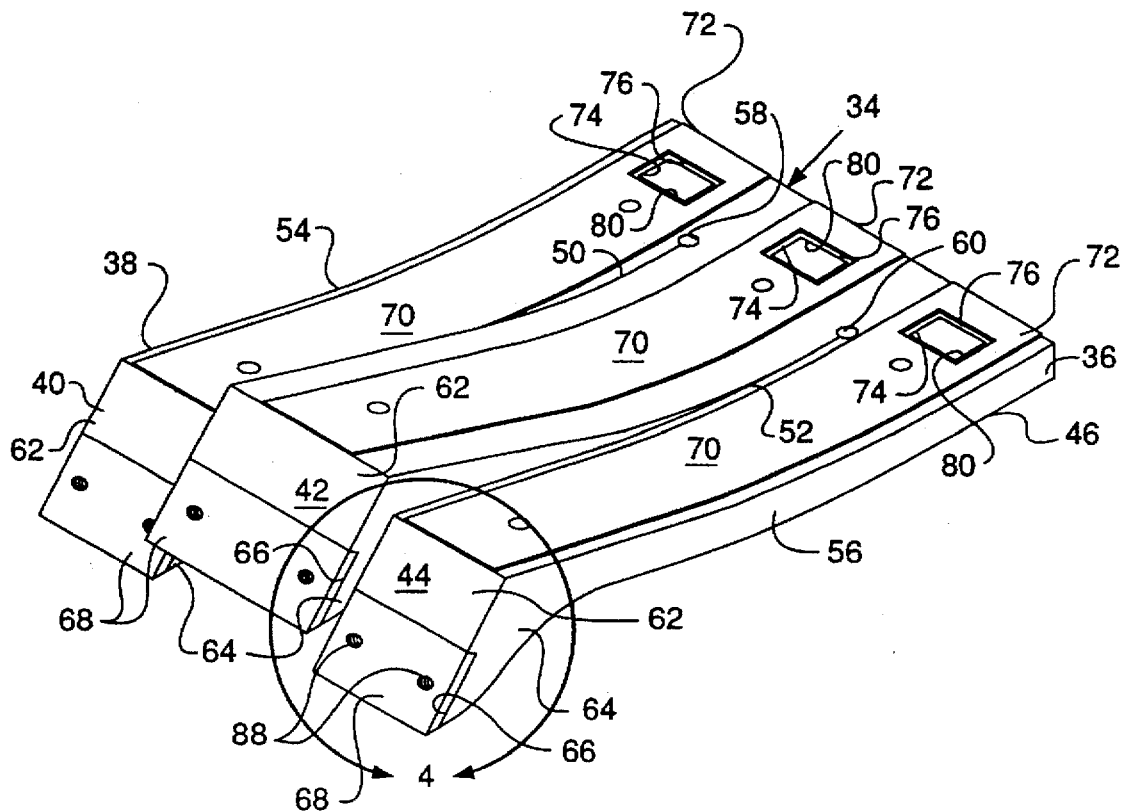
FIG. 3 is an diagrammatic isometric view of the of the scraper pad of the present invention shown removed from its mounting on the track assembly.

Referring to FIGS. 2 and 3, a scraper assembly 34 is shown in operative engagement with the idler 18. In the preferred embodiment, the scraper assembly 34 includes an elastomeric scraper pad 36. The scraper pad 36 has a first end portion 38 that defines a plurality of scraping portions 40, 42 and 44 and a second end portion 46 that is mounted to an upper surface 48 of the track roller frame 16. A pair of slots 50 and 52 are defined in the scraper pad 36 that are spaced inwardly from the opposing sides 54 and 56 of the pad as well as from one another. Being so positioned, the scraper pad is divided into the first, second and third scraping portions 40, 42 and 44 respectively. As can best be seen in FIGS. 2 and 3, each of the slots terminates at a pair of bores, 58 and 60 respectively, that extend through the scraper pad. Each bore is located between the first and second end portions, 38 and 46 respectively, a distance from the first end portion that is approximately one third to three quarters of the entire length of the scraper pad, or a distance that is sufficient to allow each of the scraping portions to move relatively independently from one another. Since the slots terminate at a bore, tearing of the scraper pad is inhibited by relative movement of the scraping portions.

The scraper pad 36 is mounted in registry with the idler 18 so that the first and third scraping portions 40 and 44, are aligned with and in continuous engagement with the contact surfaces 24 and 26 respectively. Likewise, the second scraping portion 42 is aligned with and in continuous contact with the upraised center portion 22 of the idler 18. The scraper pad 36 is constructed of any one of many readily available compositions of high quality, natural rubber that is cutting chip and abrasion resistant between the temperatures of −55 to +80 degrees C. and having a durometer reading of 68±3 durometer A. This material is relatively flexible to allow relative movement between the first and second end portions and, when used in the subject application, is extremely wear resistant. While the scraper pad is shown and described as being comprised of natural rubber, it is to be understood that several commonly know synthetic polymers may also be used without departing from the scope of the invention.

Each of the scraping portions 40, 42 and 44 is substantially planar in its free state and defines a scraping surface 62 on the distal end thereof which is best shown in FIG. 3. The scraping surfaces 62 are identical, therefore it is to be understood that the reference numerals set forth hereinafter will apply to all three scraping portions. Turning now to FIG. 3, it can be seen that each scraping portion defines an enlarged end portion 64 that further defines a relieved portion 66. Each relieved portion is adapted to receive a metal scraping insert 68. The metal inserts are fixedly attached to their respective scraping portions in any suitable fashion such as by bonding. Each metal scraping insert 68 is positioned on a lower extremity of the respective scraping portions 40, 42 or 44, so that it may directly contact one of the upraised portions 22 or contact surfaces 24 or 26 of the idler.

Each of the metal scraping inserts 68 are urged into continuous contact with the respective portions of the idler 18 by a plurality of biasing members 70. In the instant invention, the biasing members 70 are shown to be strips of metal, in this case spring steel, which are normally flat in configuration. Each biasing member is fixedly attached to the individual scraping portions by any suitable manner such as bonding. One end portion 72 of the biasing members defines an aperture 74 which is positioned in registry with a plurality of mounting inserts 76 that are defined in the second end portion 46 of the scraper pad 36 in spaced relation to one another. Each insert 76 is made of metal or hard plastic and defines an elongated slot 80 that is of sufficient size to receive the shank of a fastening member such as a bolt 82. Each bolt may be threadably received in an appropriate mounting bore (not shown) that is formed in the upper surface 48 of the track roller frame 16. Each slot is larger than the shank of the bolt to allow adjustment of the scraper pad with respect to the idler and the track roller frame. In addition to the adjustment capabilities, the inserts, being of harder material that the elastomeric pads, do not compress under the force of the fasteners and thereby aid in the securing of the scraper pad to the track roller frame.

Figure 4:
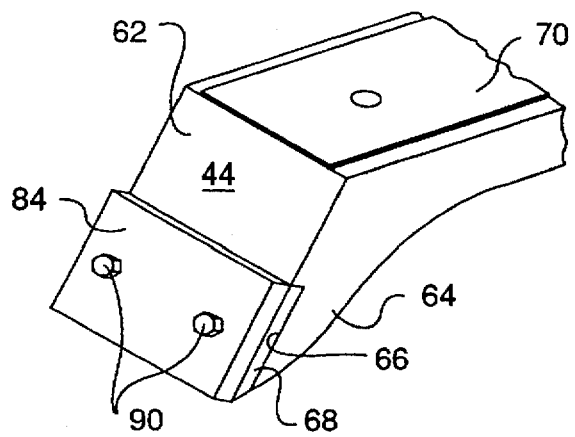
FIG. 4 is an enlarged view of the area indicated in FIG. 3 showing an alternate embodiment of the present invention.

Turning now to FIG. 4, it can be seen that an alternate embodiment of the present invention is shown. In this embodiment a second scraping insert 84 is secured to the metal scraping insert 68 which now serves as a "base" insert. The second scraping inserts 84 define a pair of mounting bores (not shown) which are aligned with a tapped mounting bore 88 (FIG. 3) of the metal scraping inserts 68 to receive a threaded fastener, such as bolt 90. In the illustrated embodiment, the second scraping insert may serve as a replacement for the base insert 68 should the base insert become worn. Alternatively, the second scraping insert 84 may be comprised of a dissimilar material that would function better in certain operating environments than would the metal scraping insert 68.

Industrial Applicability

In the operation of a track assembly, the track chain assembly 14 is rotated around the track roller frame 16 under the drive provided by the sprocket 12. As it rotates, the track chain assembly is engaged by the idler 18 as well as the track rollers 21 positioned adjacent thereto. The engagement between the idlers and the track chain occurs primarily along the contact surfaces 24 and 26 defined by the idler 18.

As the track chain assembly 14 rotates, the components in the track chain assembly above the idler tend to shed foreign matter on the contact surfaces 24 and 26 of the idler as well as the upraised center portion 22 that is positioned therebetween. The foreign matter also may find its way to the rollers 21 since there is normally an opening that exists between the track roller frame and the mounting of the idler 18. This may happen when the idler is rotated in either direction.

The scraper assembly 36 acts in two ways to reduce the amount of foreign matter that will be interposed between the areas of contact of the various track chain components. First of all the scraper assembly extends across the opening between the idler and the track roller frame and provides a shield for the track chain components so that the foreign matter falling from the track chain components above the idler will not fall on these components before they engage the idler. Secondly, this falling matter is removed from the contact surfaces of the idler. The scraping portions 40, 42 and 44 bear against these surfaces of the idler and remove the foreign matter as it rotates. Once again the removal of the foreign material occurs before it reaches the rollers and other areas of the track chain that engage the contact surfaces of the idler. This is especially critical since the wear in this area is most severe. With the removal of this material, the acceleration of wear that would normally occur between these surfaces is greatly reduced in most instances and substantially eliminated in others.

Since the second end portion 46 of the scraper pad 36 is mounted to the track roller frame 16 at an elevation that is lower than that of the first end portion 38, or scraping surfaces, a slight bend is imparted into the scraping surfaces as well as the biasing members 70. Since the biasing members tend to seek their normally flat condition, the metal scraping inserts 68 are urged into engagement with the respective surfaces of the idler 18. This is especially important when the idler is moved up and down with respect to the track roller frame as the machine traverses uneven terrain. Since the scraping inserts are biased into contact with the idler, they will follow the movement of the idler and maintain their contact therewith, thus maintaining substantially continuous contact. In doing so, the performance of the scraper is greatly enhanced and the wear of the track chain components is reduced to an even greater extent.

Other aspects, objects and advantages of this invention can be obtained from a study of the drawings, the disclosure and the appended claims.

We claim:

1. A scraping apparatus for a track assembly, comprising:
   a frame;
   an idler having an upraised center portion and a pair of contact surfaces positioned on opposite sides of the center portion, said idler being rotatably mountable to the frame in a manner wherein said contact surfaces are positioned for engagement with the track assembly;
   a scraper assembly having first and second end portions, said first end portion defining a plurality of scraping surfaces and said second end portion mounted to the frame; and
   at least one biasing member adapted for engagement with the scraper assembly to urge each of the scraping surfaces into continuous engagement with the center portion and respective contact surfaces defined by the idler.

2. The scraping apparatus as set forth in claim 1 wherein the scraper assembly further includes an elastomeric scraping pad having a first end portion that defines a first scraping portion that is adapted for continuous contact with one of the contact surfaces of the idler, a second scraping portion adapted for continuous contact with the upraised center portion, a third scraping portion adapted for contact with the other of the contact surfaces and a second end portion that is mounted to the frame.

3. The scraping apparatus as set forth in claim 1 wherein the biasing member includes a metal sheet positioned on an upper portion of the scraper pad.

4. The scraping apparatus as set forth in claim 2 wherein the first, second and third scraping portions have a metal biasing member secured to an upper portion thereof.

5. The scraping apparatus as set forth in claim 3 wherein the metal sheet is comprised of spring steel having a thickness within a range of 2 to 12 millimeters.

6. The scraping apparatus as set forth in claim 1 wherein the scraping surfaces defined by the scraping pad have metal scraping inserts affixed thereto, said scraping inserts being adapted for contact with the center portion and respective contact surfaces defined by the idler.

7. The scraping apparatus as set forth in claim 1 wherein the scraping surfaces define a relieved portion that is adapted to receive the metal scraping inserts, said metal scraping inserts being bonded to the respective scraping surface.

8. The scraping apparatus as set forth in claim 1 wherein the elastomeric scraper pad is mounted to an upper surface of the frame.

9. The scraping apparatus as set forth in claim 4 wherein the second end portion of the elastomeric scraping pad defines a plurality of non-elastomeric inserts having at least one mounting bore defined therein, said mounting bores defined by the inserts being alignable with a plurality of mounting bores defined by the frame, said aligned bores being adapted for receiving a fastener member to secure the second end portion of the elastomeric scraper pad to the frame.

10. The scraping apparatus as set forth in claim 7 wherein the metal scraping insert bonded to the respective scraping surfaces form a base insert having at least one tapped mounting bore.

11. The scraping apparatus as set forth in claim 10 wherein a second scraping insert having at least one mounting bore, is adapted for releasable attachment to the metal scraping insert, said mounting bore of the second scraping insert being alignable with the tapped mounting bore of the base insert to receive a fastener assembly to secure the second scraping insert thereto.

12. The scraping apparatus as set forth in claim 11 wherein the second scraping insert is formed of material that is different from that of the base insert.

13. A scraping apparatus for a track assembly, comprising:
   a frame;
   an idler having an upraised center portion and a pair of contact surfaces positioned on opposite sides of the center portion, said idler being rotatably mountable to the frame in a manner wherein said contact surfaces are positioned for engagement with the track assembly; and
   a scraper assembly having first and second end portions, said first end portion defining a plurality of scraping portions having an enlarged mounting portion and a relieved portion formed thereon, and said second end portion being generally planar in configuration and extending from the first end portion, said second end portion being mounted to the frame in a manner wherein each of said scraping portions are positioned for alignment and continuous engagement with the center portion and contact surfaces defined by the idler; and
   scraping inserts having a configuration adapted for positioning within the relieved portion defined by the scraper portions and being fixedly thereto.

14. The scraping apparatus as set forth in claim 13 wherein the idler is mounted for pivoting movement with respect to the frame.

15. The scraping apparatus as set forth in claim 14 wherein a biasing member is secured to the scraper assembly to continually urge the first end portions thereof into engage ment with the idler throughout its movement with respect to the frame.

16. The scraping apparatus as set forth in claim 13 wherein the scraping inserts are metal and define at least one tapped mounting bore therein.

17. The scraping apparatus as set forth in claim 16 wherein a second scraping insert is adapted for releasable attachment to the metal scraping inserts.

* * * * *